(12) United States Patent
Yoneda

(10) Patent No.: US 7,233,345 B2
(45) Date of Patent: Jun. 19, 2007

(54) COMMUNICATION APPARATUS AND METHOD

(75) Inventor: Michiko Yoneda, Tokyo (JP)

(73) Assignee: NEC Corporation, Tokyo (JP)

( * ) Notice: Subject to any disclaimer, the term of this patent is extended or adjusted under 35 U.S.C. 154(b) by 279 days.

(21) Appl. No.: 10/843,419

(22) Filed: May 12, 2004

(65) Prior Publication Data

US 2004/0227811 A1    Nov. 18, 2004

(30) Foreign Application Priority Data

May 13, 2003   (JP) .............................. 2003-134811

(51) Int. Cl.
*H04N 7/14* (2006.01)
(52) U.S. Cl. ............... 348/14.08; 348/14.01; 348/14.11
(58) Field of Classification Search ............. 348/14.01, 348/14.09, 14.1, 14.11, 14.12, 14.13; 704/270.1, 704/246, 272; 329/88.12
See application file for complete search history.

(56) References Cited

U.S. PATENT DOCUMENTS

| | | | |
|---|---|---|---|
| 5,572,728 | A | 11/1996 | Tada et al. |
| 5,642,135 | A | 6/1997 | Noguchi et al. |
| 6,046,734 | A | 4/2000 | Noguchi et al. |
| 2003/0063321 | A1 | 4/2003 | Inoue et al. |

FOREIGN PATENT DOCUMENTS

| | | | |
|---|---|---|---|
| CN | 1100874 | A | 3/1995 |
| CN | 1298173 | A | 6/2001 |
| CN | 1365487 | A | 8/2002 |
| EP | 1 067 791 | A2 | 1/2001 |
| JP | 404150686 | A * | 5/1992 |
| JP | 404211593 | A * | 8/1992 |
| JP | 11-355747 | | 12/1999 |
| JP | 2000-032422 | * | 1/2000 |
| JP | 1 067 791 | A2 | 1/2001 |
| JP | 02002215514 | A * | 8/2002 |

* cited by examiner

*Primary Examiner*—Melur Ramakrishnaiah
(74) *Attorney, Agent, or Firm*—Foley & Lardner LLP

(57) ABSTRACT

A communication apparatus includes an image sensing unit, voice recognition unit, keyword detection unit, auxiliary image selection unit, input image selector switch, and transmission unit. The image sensing unit senses a camera image. The voice recognition unit recognizes a phrase from input voice. The keyword detection unit detects coincidence between a registered keyword and the phrase output from the voice recognition unit. The auxiliary image selection unit selects a specific auxiliary image associated with the registered keyword in response to a coincidence detection output from the keyword detection unit. In response to the coincidence detection output, the input image selector switch selectively outputs one of the camera image output from the image sensing unit and an image containing the auxiliary image output from the auxiliary image selection unit. The transmission unit transmits the input voice and the image output from the input image selector switch. A communication method is also disclosed.

8 Claims, 12 Drawing Sheets

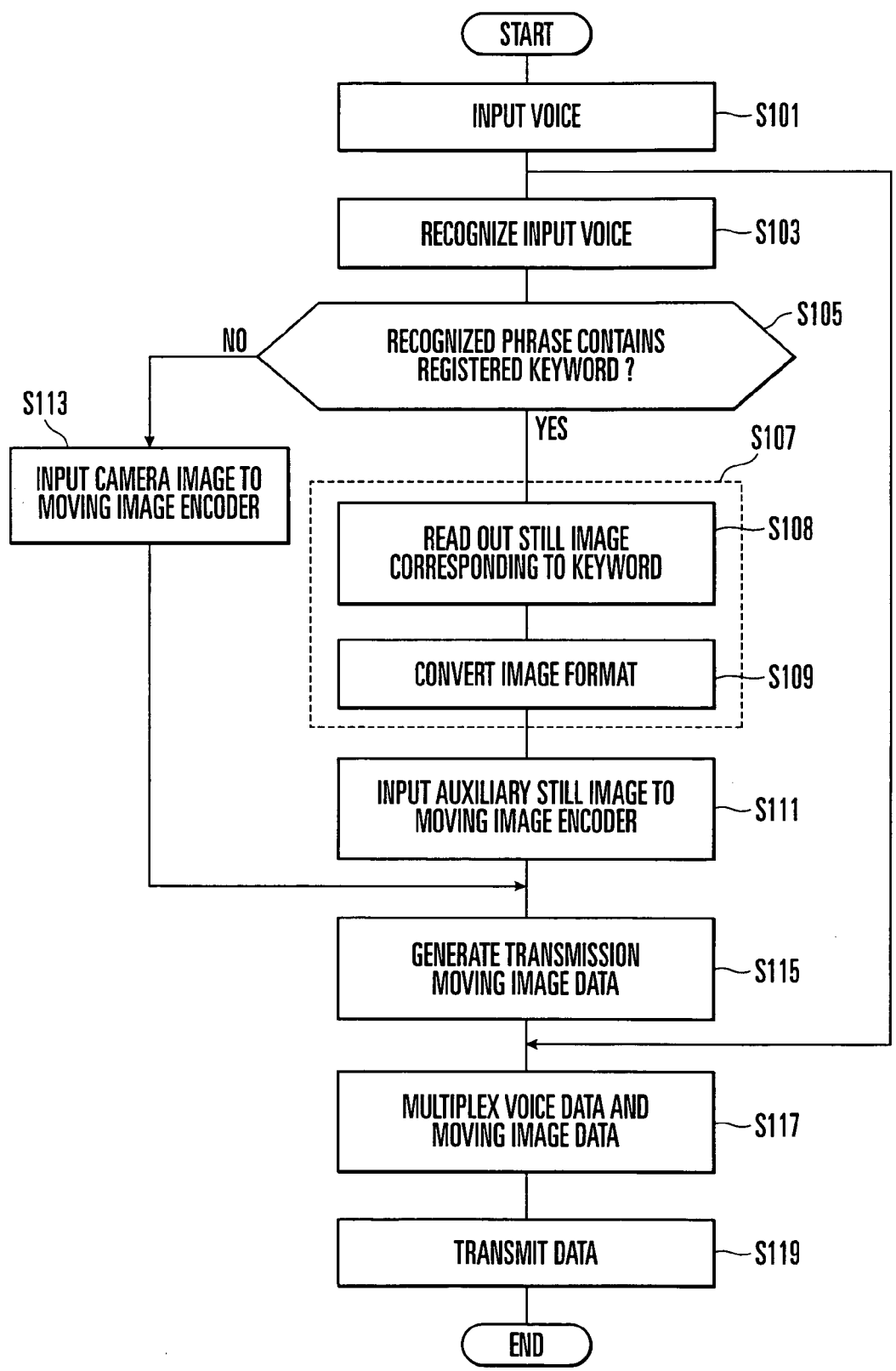
F I G. 4

COMMUNICATION APPARATUS AND METHOD

BACKGROUND OF THE INVENTION

The present invention relates to a communication apparatus and method and, more particularly, to a communication apparatus and method which selectively transmit/receive a sensed camera image and an image containing a specific auxiliary image.

Generally, a speaker who is using a TV phone often looks at only the video image of the other party during the speech communication. In some cases, however, he/she may want to have conversation while seeing auxiliary materials and the like. In, e.g., a video conference, if a presentation is done while showing presentation materials such as concrete charts, the participants can more easily understand the contents. Even in TV phones for home use or in cellular phones, people can much more enjoy in conversation if they can see photographs or maps together with other parties. A conventional video conference system having a function of sending auxiliary materials has a means for transmitting still images in addition to a video image and voice data. Materials are stored in advance as still images such as JPEG and transmitted by a predetermined key operation.

A video conference system using voice recognition saves users from doing such a predetermined key operation. FIG. 13 shows an example of the video conference system.

Referring to FIG. 13, the conventional video conference system includes a transmission apparatus 50 and a reception apparatus 51. The transmission apparatus 50 comprises a voice reception unit 3, an image sensing unit 4 such as a camera, a voice encoder 5 which encodes received voice, and a moving image encoder 6 which encodes a received moving image.

The transmission apparatus 50 also comprises a still image database 52 and a still image encoder 53 which encodes still image data received from the still image database 52. The still image database 52 stores still image data as auxiliary materials to be used in a conference together with voice data as a keyword.

Voice obtained by the voice encoder 5, a moving image obtained by the moving image encoder 6, and still image compressed data obtained by the still image encoder 53 are multiplexed by a multiplexing unit 54 and transmitted to the reception apparatus 51 through a transmission unit 7. The auxiliary images stored in the still image database 52 are transmitted to the reception apparatus 51 in advance.

The reception apparatus 51 comprises a demultiplexing unit 55 which demultiplexes the received multiplexed data into individual compressed data, and a voice decoder 9, moving image decoder 10, and still image decoder 56, which decode the voice, moving image, and still image compressed data. The reception apparatus 51 also comprises a voice recognition unit 58 and a still image database 57.

In the reception apparatus 51, the auxiliary image data received in advance are held in the still image database 57. The keyword is registered in the voice recognition unit 58 and associated with specific still image data in the still image database 57.

During video conference, multiplexed data received through a reception unit 8 is demultiplexed into moving image and voice compressed data by the demultiplexing unit 55. The moving image and voice data are decoded by the moving image decoder 10 and voice decoder 9 and output to a display unit 12 and a voice output unit 11, respectively. Simultaneously, the output data from the voice decoder 9 is input to the voice recognition unit 58. When the recognized voice data coincides with the registered keyword, the result is sent to a data determination unit 59. The data determination unit 59 selects still image data corresponding to the recognized keyword from the still image database 57 so that the selected still image data is displayed on the display unit 12 as an auxiliary image.

With the above arrangement, the device on the other party side can be caused to display the auxiliary image without any specific key operation (e.g., Japanese Patent Laid-Open No. 11-355747).

However, in communication using a communication apparatus which displays an image in real time, a communication apparatus and method with higher operability, which allow displaying an auxiliary image other than a main image without taking care to the operability, are demanded.

SUMMARY OF THE INVENTION

The present invention has been made to solve the above problem, and has as its object to provide a communication apparatus and method with higher operability, which allow displaying an auxiliary image other than a main image without taking care to the operability in communication using a communication apparatus which displays an image in real time.

In order to achieve the above object, according to the present invention, there is provided a communication apparatus comprising image sensing means for sensing a camera image, voice recognition means for recognizing a phrase from input voice, keyword detection means for detecting coincidence between a registered keyword and the phrase output from the voice recognition means, auxiliary image selection means for selecting a specific auxiliary image associated with the registered keyword in response to a coincidence detection output from the keyword detection means, input image switching means for, in response to the coincidence detection output, selectively outputting one of the camera image output from the image sensing means and an image containing the auxiliary image output from the auxiliary image selection means, and transmission means for transmitting the input voice and the image output from the input image switching means.

According to the present invention, there is also provided a communication method comprising the steps of sensing a camera image, recognizing a phrase from input voice, detecting coincidence between the phrase and a registered keyword, selecting a specific auxiliary image associated with the registered keyword in response to a coincidence detection output, in response to the coincidence detection output, selectively outputting one of the sensed camera image and an image containing the selected auxiliary image, and transmitting one of the output camera image and the auxiliary image.

BRIEF DESCRIPTION OF THE DRAWINGS

FIG. 4 is a flowchart showing the operation on the transmitting side when a still image is used as an auxiliary image;

DESCRIPTION OF THE PREFERRED EMBODIMENTS

The embodiments of the present invention will be described below in detail with reference to the accompanying drawings.

FIRST EMBODIMENT

Figure 1:
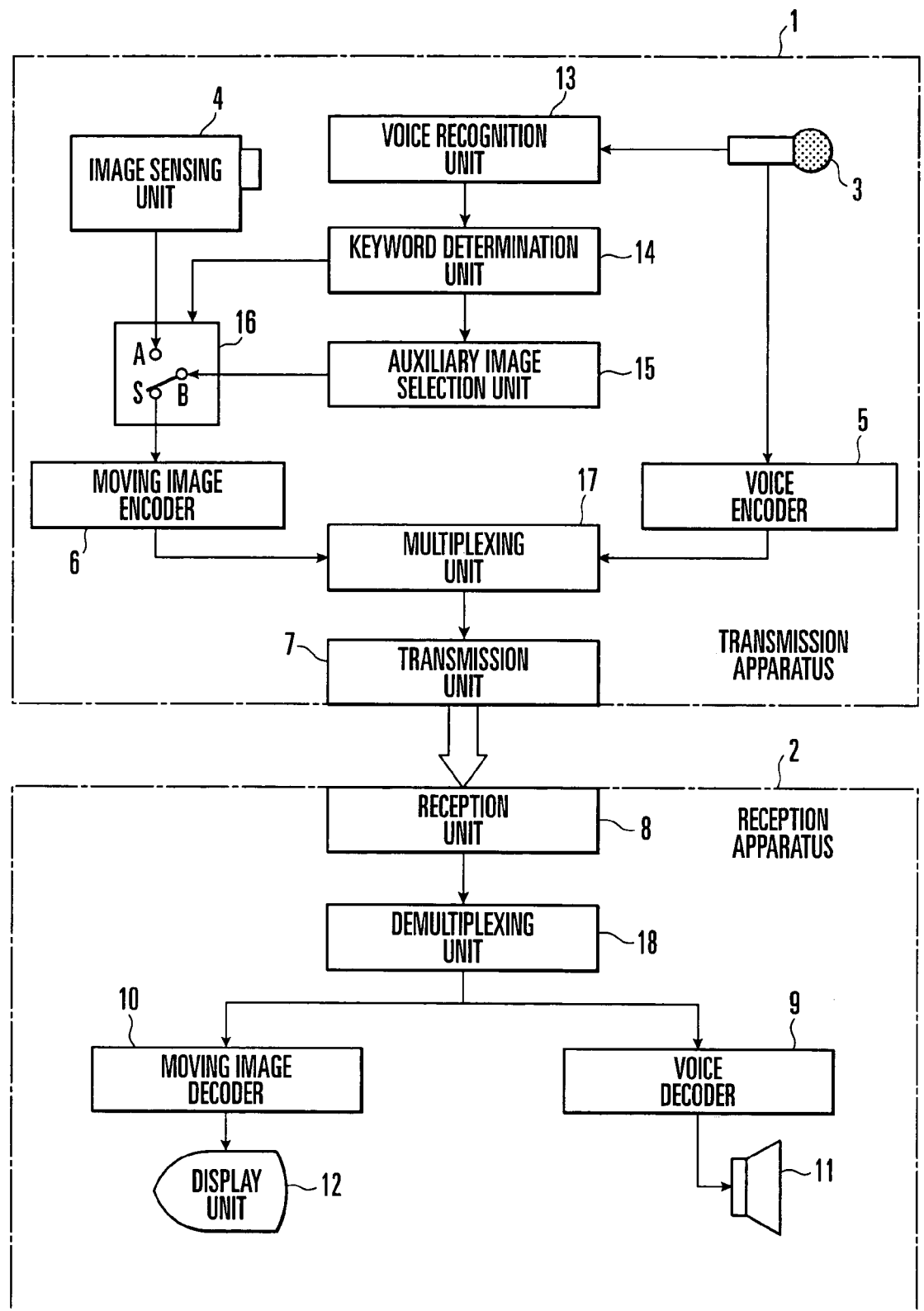
FIG. 1 is a block diagram showing the schematic arrangement of the first embodiment.

FIG. 1 shows the schematic arrangement of the first embodiment. In a TV phone according to this embodiment, one TV phone apparatus comprises both a transmission apparatus 1 and a reception apparatus 2. In the following description, a description of the transmitting-side reception apparatus and that of the receiving-side transmission apparatus will be omitted to for easy understanding.

Referring to FIG. 1, this embodiment includes the transmission apparatus 1, the reception apparatus 2, and an information communication network.

The information communication network is capable of bidirectional communication data transmission/reception using wire communication or wireless communication.

The transmission apparatus 1 converts voice input by a sender and an image to be displayed on the reception apparatus into data formats transmittable through the information communication network and transmits the data to the reception apparatus.

The reception apparatus 2 receives the data transmitted from the transmission apparatus 1 through the information communication network and outputs/displays the voice and image.

The transmission apparatus 1 further comprises a voice reception unit 3, image sensing unit 4, voice encoder 5, moving image encoder 6, multiplexing unit 17, voice recognition unit 13, keyword determination unit 14, auxiliary image selection unit 15, input image selector switch 16, and transmission unit 7.

The image sensing unit 4 is a still image photographing apparatus such as a digital camera or a moving image photographing apparatus such as a video camera. The image sensing unit 4 is incorporated in or externally connected to the transmission apparatus 1. The image sensing unit 4 senses the video image of a sender in real time, converts the sensed image into an electrical signal, and outputs it to the input image selector switch 16 as image data.

The voice reception unit 3 is a sound collection apparatus which collects voice uttered by a sender. The voice reception unit 3 is incorporated in or externally connected to the transmission apparatus 1. The voice reception unit 3 collects voice uttered by a sender in real time, converts the collected voice into an electrical signal, and outputs the converted voice to the voice recognition unit 13 and voice encoder 5 as voice data.

The voice recognition unit 13 is an information processing function of receiving the voice data output from the voice reception unit 3 and automatically recognizing a phrase contained in the received voice data. The phrase recognized by this voice recognition processing is output as recognized phrase data.

The keyword determination unit 14 is an information processing function of determining whether the recognized phrase data output from the voice recognition unit 13 coincides with a keyword that is registered in advance. The keyword determination unit 14 outputs a control signal to the input image selector switch 16 to selectively connect terminals in it and outputs an instruction (auxiliary image selection instruction) to the auxiliary image selection unit 15 to select an auxiliary image. The auxiliary image selection instruction contains the keyword which is determined to coincide with the recognized phrase data. The control signal and auxiliary image selection instruction are output from the keyword determination unit 14 on the basis the determination result by it.

The auxiliary image selection unit 15 receives the auxiliary image selection instruction transmitted from the keyword determination unit 14. On the basis of the received auxiliary image selection instruction, the auxiliary image selection unit 15 selects auxiliary image data corresponding to the keyword and outputs it to the input image selector switch 16.

The input image selector switch 16 selectively outputs, to the moving image encoder 6, at least one of the image data output from the image sensing unit 4 and the auxiliary image data output from the auxiliary image selection unit 15. Switching of the image data to be output to the moving image encoder 6 is done by the control signal output from the keyword determination unit 14.

The moving image encoder 6 is an image data conversion function of converting the data format to transmit the image data output from the image sensing unit 4 or the auxiliary image output from the auxiliary image selection unit 15 to the reception apparatus 2. A format which can transmit moving image data in an optimum state to the reception apparatus 2 through the information communication network is used as the conversion format.

The voice encoder 5 is a voice data conversion function of converting the data format to transmit the voice data output from the voice reception unit 3 to the reception apparatus 2. A format which can transmit voice data in an optimum state to the reception apparatus 2 through the information communication network is used as the conversion format.

The multiplexing unit 17 is a data synthesis function of multiplexing the transmission moving image data which has undergone data format conversion by the moving image encoder 6 and the transmission voice data which has undergone data format conversion by the voice encoder 5. The multiplexed data is output to the transmission unit 7.

The transmission unit 7 is a data transmission function. The transmission unit 7 transmits the multiplexed data output from the multiplexing unit 17 to a reception unit 8 of the reception apparatus 2 through the information communication network.

The reception apparatus 2 further comprises the reception unit 8, a demultiplexing unit 18, voice decoder 9, moving image decoder 10, voice output unit 11, and display unit 12.

The reception unit 8 is a data reception function. The reception unit 8 receives the multiplexed data transmitted from the transmission unit 7 of the transmission apparatus 1 through the information communication network and outputs the received multiplexed data to the demultiplexing unit 18.

The demultiplexing unit 18 is a data demultiplexing function of demultiplexing the multiplexed data sent from the reception unit 8 into voice data and moving image data. The demultiplexed voice data is output to the voice decoder 9. The demultiplexed moving image data is output to the moving image decoder 10.

The voice decoder 9 is a voice data format conversion function. The voice decoder 9 converts the voice data demultiplexed by the demultiplexing unit 18 from the format suitable for transmission through the information communication network into a format that can be output from the voice output unit 11.

The moving image decoder 10 is an image data format conversion function. The moving image decoder 10 converts the moving image data demultiplexed by the demultiplexing unit 18 from the format suitable for transmission through the information communication network into a format that can be displayed on the display unit 12.

The voice output unit 11 is a voice output device such as a speaker. The voice output unit 11 outputs the voice data which has undergone format conversion by the voice decoder 9 as voice.

The display unit 12 is an image display device. The display unit 12 outputs the moving image data which has undergone format conversion by the moving image decoder 10 as a display image.

Figure 2:
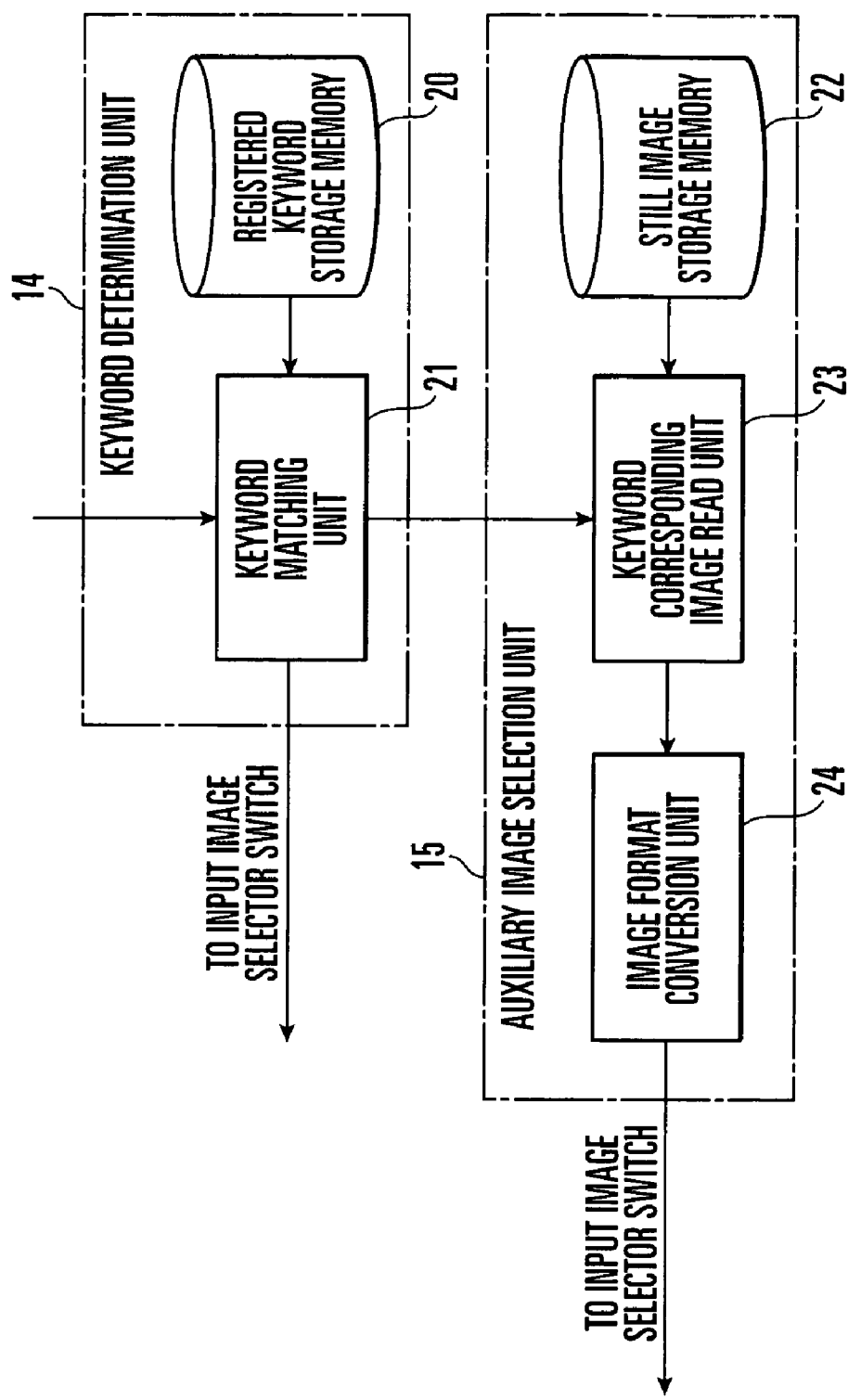
FIG. 2 is a block diagram showing details of the internal arrangement of a keyword determination unit and auxiliary image selection unit when a still image is used as an auxiliary image.

FIG. 2 shows details of the internal arrangement of the keyword determination unit 14 and auxiliary image selection unit 15 when a still image is used as an auxiliary image.

Referring to FIG. 2, the keyword determination unit 14 further includes a registered keyword storage memory 20 and keyword matching unit 21. The auxiliary image selection unit 15 further includes a still image storage memory 22, keyword corresponding image read unit 23, and image format conversion unit 24.

The registered keyword storage memory 20 is a storage device which stores the keyword that is registered in advance. The registered keyword storage memory 20 stores a plurality of keywords which are registered in advance by registrants and to be used for keyword determination.

The keyword matching unit 21 is an information processing function of executing search processing to determine whether a keyword that coincides with the recognized phrase data output from voice recognition unit 13 is registered in the registered keyword storage memory 20. In response to input of recognized phrase data output from the voice recognition unit 13, the keyword matching unit 21 searches the registered keyword storage memory 20. On the basis of the search result, the keyword matching unit 21 outputs a control signal corresponding to a case wherein a keyword that coincides with the recognized phrase data is registered or a control signal corresponding to a case wherein no keyword that coincides with the recognized phrase data is registered. If it is determined as the result of search that a keyword that coincides with the recognized phrase data is registered, an auxiliary image selection instruction to select an auxiliary image corresponding to the keyword is output to the keyword corresponding image read unit 23.

The still image storage memory 22 is a storage device which stores still images to be used as auxiliary images in advance. A still image which may be used as an auxiliary image during speech communication using the TV phone according to this embodiment is stored in correspondence with a keyword to be used to output the still image.

The keyword corresponding image read unit 23 is an information processing function of reading out a still image from the still image storage memory 22. In response to the auxiliary image selection instruction output from the keyword matching unit 21, the keyword corresponding image read unit 23 reads out a still image corresponding to the keyword from the still image storage memory 22 and outputs the still image to the image format conversion unit 24.

The image format conversion unit 24 is a data conversion function of converting the image format of the still image read out by the keyword corresponding image read unit 23. The image format conversion unit 24 converts the image format of the still image as an auxiliary image, which is output from the keyword corresponding image read unit 23, to an image format suitable for input to the moving image encoder 6. When the still image has, e.g., a JPEG format, the image format conversion unit 24 expands it to a YUV format.

Figure 3:
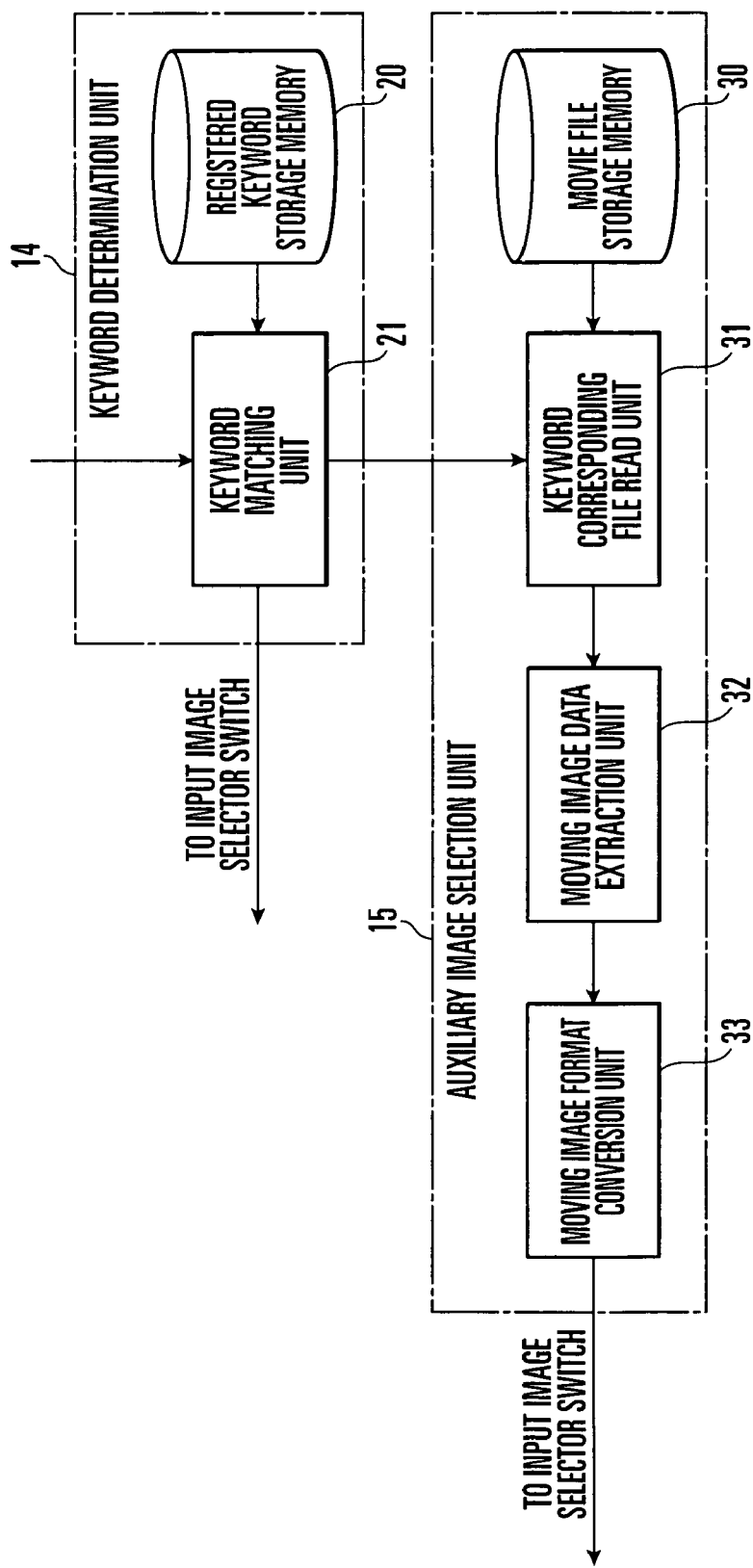
FIG. 3 is a block diagram showing details of the internal arrangement of the keyword determination unit and auxiliary image selection unit when a moving image is used as an auxiliary image.

FIG. 3 shows details of the internal arrangement of the keyword determination unit 14 and auxiliary image selection unit 15 when a moving image is used as an auxiliary image.

Referring to FIG. 3, the keyword determination unit 14 further includes the registered keyword storage memory 20 and keyword matching unit 21. The auxiliary image selection unit 15 further includes a movie file storage memory 30, keyword corresponding file read unit 31, moving image data extraction unit 32, and moving image format conversion unit 33.

The registered keyword storage memory 20 is a storage device which stores the keyword that is registered in advance. The registered keyword storage memory 20 stores a plurality of keywords which are registered in advance by registrants and to be used for keyword determination.

The keyword matching unit 21 is an information processing function of executing search processing to determine whether a keyword that coincides with the recognized phrase data output from voice recognition unit is registered in the registered keyword storage memory 20. In response to input of recognized phrase data output from the voice recognition unit, the keyword matching unit 21 searches the registered keyword storage memory 20. On the basis of the search result, the keyword matching unit 21 outputs a control signal corresponding to a case wherein a keyword that coincides with the recognized phrase data is registered or a control signal corresponding to a case wherein no keyword that coincides with the recognized phrase data is registered. If it is determined as the result of search that a keyword that coincides with the recognized phrase data is registered, an auxiliary image selection instruction to select an auxiliary image corresponding to the keyword is output to the keyword corresponding file read unit 31.

The movie file storage memory 30 is a storage device which stores movie files to be used as auxiliary images in advance. A movie file which may be used as an auxiliary image during speech communication using the TV phone according to this embodiment is stored in correspondence with a keyword to be used to output the movie file.

The keyword corresponding file read unit 31 is an information processing function of reading out a movie file from the movie file storage memory 30. In response to the auxiliary image selection instruction output from the keyword matching unit 21, the keyword corresponding file read unit 31 reads out a movie file corresponding to the keyword from the movie file storage memory 30 and outputs the movie file to the moving image data extraction unit 32.

The moving image data extraction unit 32 is a data extraction function of separating the movie file and extracting image data. The image data extracted by the moving image data extraction unit 32 is output to the moving image format conversion unit 33.

The moving image format conversion unit 33 is a data conversion function of converting the image format of the image data extracted by the moving image data extraction unit 32. The moving image format conversion unit 33 converts the image format of the image data as an auxiliary image, which is output from the moving image data extraction unit 32, to an image format suitable for input to the moving image encoder 6. For example, the image format is converted into, e.g., a YUV format. The converted moving image data is input to the moving image encoder 6 in correspondence with each frame.

Table 1 is a registered keyword data table which indicates an example of registered keywords stored in the registered keyword storage memory 20. Referring to Table 1, the registered keyword data table stores keywords which are registered in advance by the user of the TV phone according to this embodiment. A keyword is stored by making text data used in registering the keyword correspond to voice data to be actually used for voice recognition.

TABLE 1

| Registered Keyword Data Table | | |
|---|---|---|
| Registered Keyword | Pronunciation | ... |
| Image 1 | Gazo-ichi | |
| Image 2 | Gazo-ni | |
| . | . | |
| . | . | |
| . | . | |
| Moving image 1 | Doga-ichi | |
| Moving image 2 | Doga-ni | |
| . | . | |
| . | . | |
| . | . | |
| Display | Hyoji | |
| End of display | Hyoji shuryo | |
| . | . | |
| . | . | |
| . | . | |

Table 2 is a still image data table which indicates an example of correspondences between registered keywords and image data stored in the still image storage memory 22. Referring to Table 2, the still image data table stores a keyword contained in an auxiliary image selection instruction in correspondence with still image data. The still image data table is used by the keyword corresponding image read unit 23 which has received an auxiliary image selection instruction to read out a still image as an auxiliary image.

TABLE 2

| Still Image Data Table | | |
|---|---|---|
| Keyword | Still Image Data | ... |
| Image 1 | Image 1 data | |
| Image 2 | Image 2 data | |
| . | . | |
| . | . | |
| . | . | |

Table 3 is a movie file data table which indicates an example of correspondences between registered keywords and movie file data stored in the movie file storage memory 30. Referring to Table 3, the movie file data table stores a keyword contained in an auxiliary image selection instruction in correspondence with movie file data. The movie file data table is used by the keyword corresponding file read unit 31 which has received an auxiliary image selection instruction to read out a movie file as an auxiliary image.

TABLE 3

| Movie File Data Table | | |
|---|---|---|
| Keyword | Movie File | ... |
| Moving image 1 | Movie 1 | |
| Moving image 2 | Movie 2 | |
| . | . | |
| . | . | |
| . | . | |

The operation of this embodiment will be described next. FIG. 4 shows the operation on the transmitting side when a still image is used as an auxiliary image.

Referring to FIG. 4, in step S101, the user of the TV phone to be described in this embodiment inputs voice for speech communication from the voice reception unit 3. The voice reception unit 3 converts the voice input in step S101 into an electrical signal and outputs it to the voice recognition unit 13 and voice encoder 5 as voice data.

In step S103, the voice data output from the voice reception unit 3 is input to the voice recognition unit 13. The voice recognition unit 13 executes voice recognition processing for automatically recognizing a phrase contained in the received voice data. The recognized phrase is output as recognized phrase data.

The recognized phrase data output from the voice recognition unit 13 is sent to the keyword determination unit 14. In step S105, the keyword determination unit 14 determines whether a registered keyword is contained in the recognized phrase data. If it is determined in step S105 that a registered keyword is contained in the recognized phrase data (YES), the keyword determination unit 14 outputs a control signal (switching signal) to control to connect a terminal B to a terminal S in the input image selector switch 16 and an auxiliary image selection instruction to read out an auxiliary image. The flow advances to step S107.

In step S107, the auxiliary image selection instruction output from the keyword determination unit 14 is input to the auxiliary image selection unit 15. Upon receiving the auxiliary image selection instruction, the auxiliary image selection unit 15 causes the keyword corresponding image read unit 23 and image format conversion unit 24 to execute the instruction.

More specifically, in step S108, the keyword corresponding image read unit 23 reads out a still image corresponding to the keyword from the still image storage memory 22 and outputs the readout auxiliary image corresponding to the keyword to the image format conversion unit 24. In step S109, the image format conversion unit 24 converts the image format of the still image as an auxiliary image, which is output from the keyword corresponding image read unit 23, into an image format suitable for input to the moving image encoder 6 and outputs the image data to the input image selector switch 16.

In step S111, the auxiliary still image output from the auxiliary image selection unit 15 is input to the moving image encoder 6 through the terminals B and S of the input image selector switch 16.

On the other hand, if it is determined in step S105 that no registered keyword is contained in the recognized phrase data (NO), the keyword determination unit 14 outputs a control signal to control to connect a terminal A to the terminal S in the input image selector switch 16. The flow advances to step S113.

In step S113, the camera image output from the image sensing unit 4 is input to the moving image encoder 6.

In step S115, the moving image encoder 6 generates transmission moving image data by converting the camera image data output from the image sensing unit 4 or the auxiliary still image data output from the auxiliary image selection unit 15 into a format suitable for transmission through the network and outputs the transmission moving image data to the multiplexing unit 17.

In step S117, the multiplexing unit 17 multiplexes the transmission voice data which has been output from the voice reception unit 3 and undergone data format conversion by the voice encoder 5 in step S101 and the transmission moving image data output from the moving image encoder 6 in step S115 and outputs the multiplexed data to the transmission unit 7.

In step S119, the transmission unit 7 transmits the multiplexed data output from the multiplexing unit 17 through the information communication network.

Figure 5:
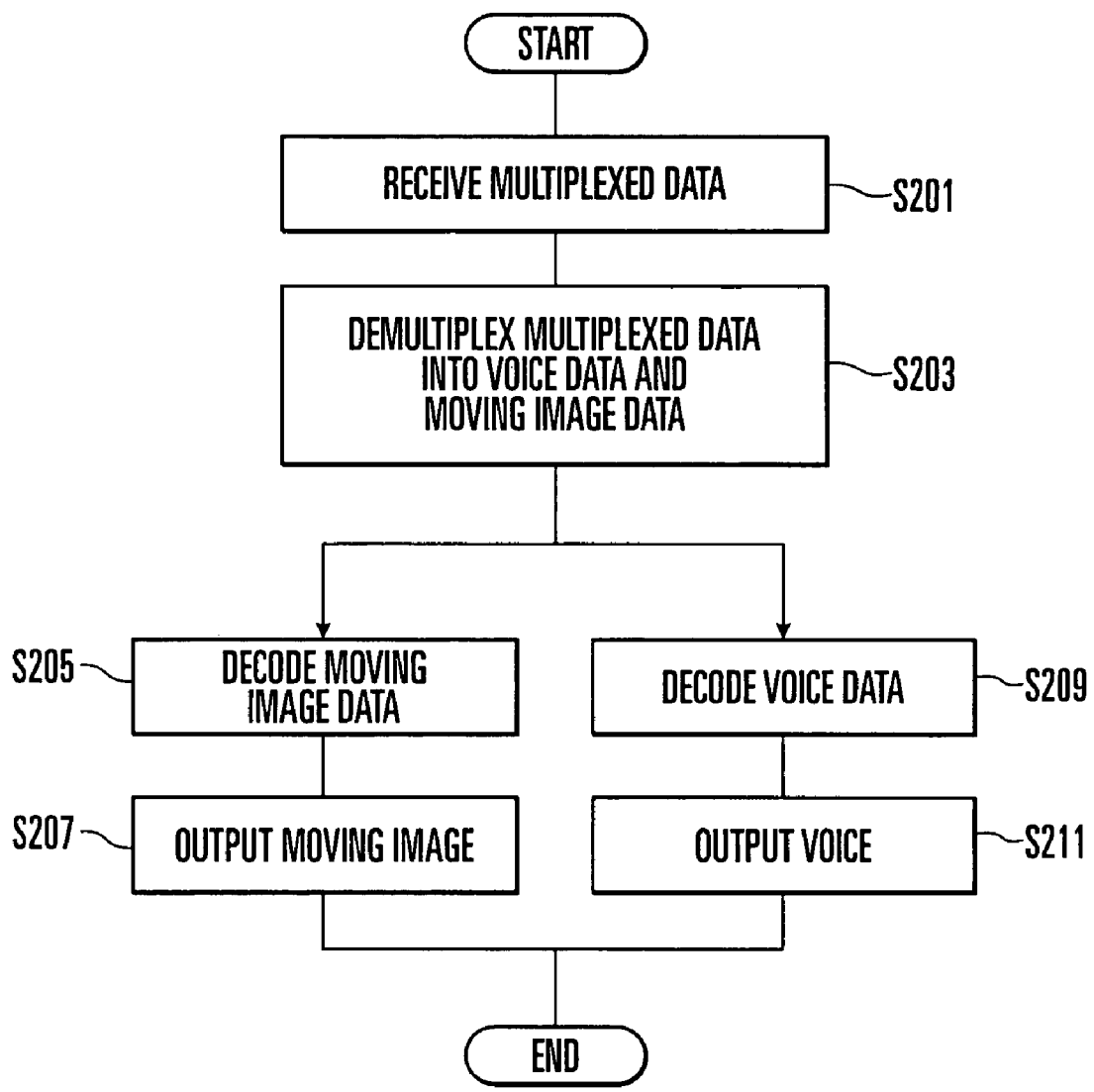
FIG. 5 is a flowchart showing the operation on the receiving side.

FIG. 5 shows the operation on the receiving side in the operation of this embodiment.

In step S201, the reception unit 8 receives, through the information communication network, the multiplexed data transmitted from the transmission unit 7 in step S119 in FIG. 4 and outputs the received multiplexed data to the demultiplexing unit 18.

In step S203, the demultiplexing unit 18 demultiplexes the multiplexed data output from the reception unit 8 into voice data and moving image data. The demultiplexed voice data is output to the voice decoder 9. The demultiplexed moving image data is output to the moving image decoder 10.

In step S205, the moving image decoder 10 converts the moving image data demultiplexed by the demultiplexing unit 18 from the format suitable for transmission through the information communication network into a format that can be displayed on the display unit 12, and outputs the moving image data.

In step S207, the display unit 12 displays, as a display image, the moving image data which has undergone format conversion by the moving image decoder 10 and been output.

In step S209, the voice decoder 9 converts the voice data demultiplexed by the demultiplexing unit 18 from the format suitable for transmission through the information communication network into a format that can be output from the voice output unit 11, and outputs the voice data.

In step S211, the voice output unit 11 outputs, as voice, the voice data which has undergone format conversion by the voice decoder 9 and been output.

Figure 6:
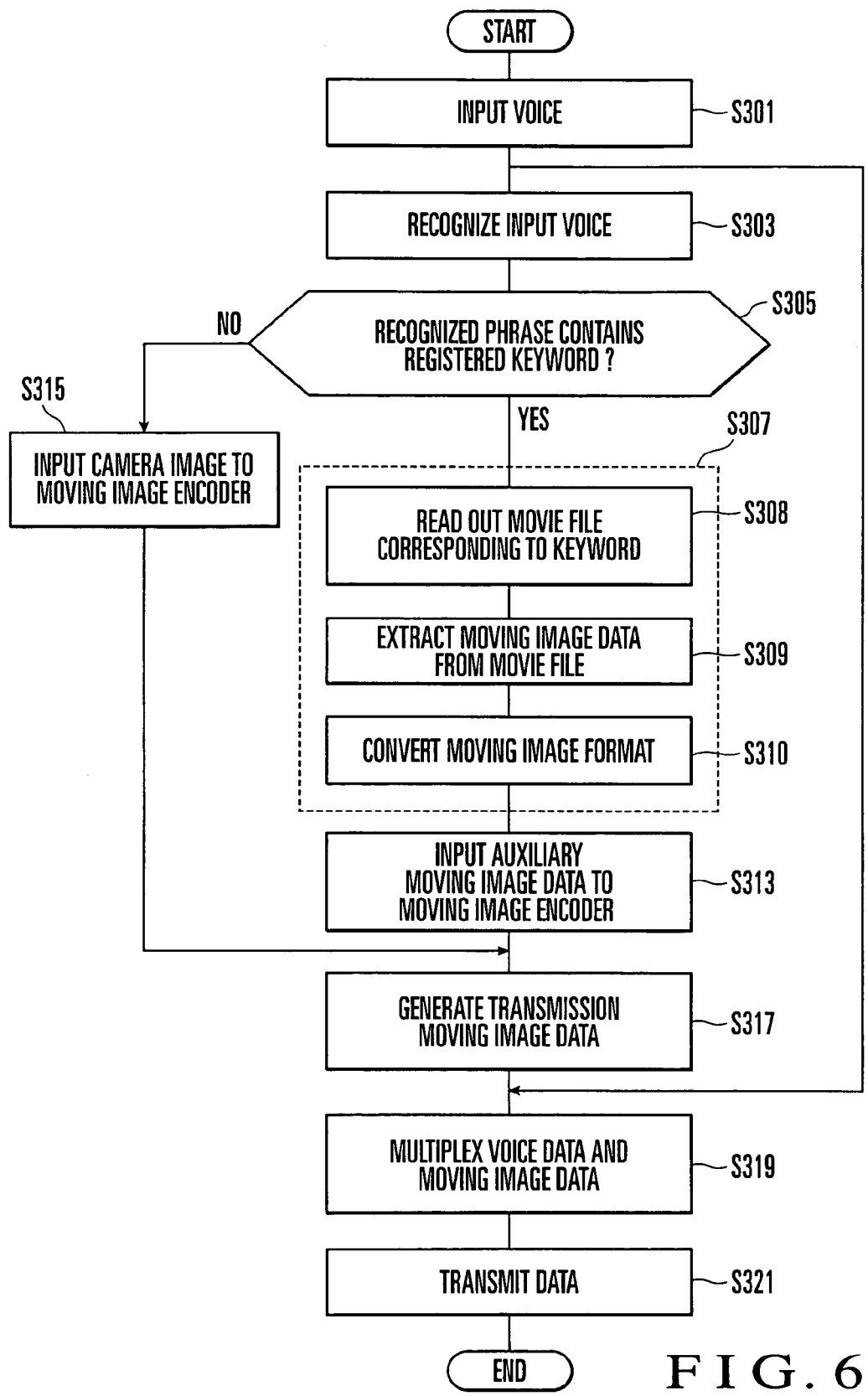
FIG. 6 is a flowchart showing the operation on the transmitting side when a movie file is used as an auxiliary image.

FIG. 6 shows a case wherein a movie file is used as an auxiliary image in the operation according to this embodiment.

Referring to FIG. 6, in step S301, the user of the TV phone to be described in this embodiment inputs voice for speech communication from the voice reception unit 3. The voice reception unit 3 converts the voice input in step S301 into an electrical signal and outputs it to the voice recognition unit 13 and voice encoder 5 as voice data.

In step S303, the voice data output from the voice reception unit 3 is input to the voice recognition unit 13. The voice recognition unit 13 executes voice recognition processing for automatically recognizing a phrase contained in the received voice data. The recognized phrase is output as recognized phrase data.

The recognized phrase data output from the voice recognition unit 13 is sent to the keyword determination unit 14. In step S305, the keyword determination unit 14 determines whether a registered keyword is contained in the recognized phrase data. If it is determined in step S305 that a registered keyword is contained in the recognized phrase data (YES), the keyword determination unit 14 outputs a control signal (switching signal) to control to connect the terminal B to the terminal S in the input image selector switch 16 and an auxiliary image selection instruction to read out an auxiliary image. The flow advances to step S307.

In step S307, the auxiliary image selection instruction output from the keyword determination unit 14 is input to the auxiliary image selection unit 15. Upon receiving the auxiliary image selection instruction, the auxiliary image selection unit 15 causes the keyword corresponding file read unit 31, moving image data extraction unit 32, and moving image format conversion unit 33 to execute the instruction.

More specifically, in step S308, the keyword corresponding file read unit 31 reads out a movie file from the movie file storage memory 30 and outputs the readout movie file corresponding to the keyword to the moving image data extraction unit 32. In step S309, the moving image data extraction unit 32 extracts image data from the movie file corresponding to the keyword, which is output from the keyword corresponding file read unit 31, and outputs the extracted image data to the moving image format conversion unit 33. In step S310, the moving image format conversion unit 33 converts the moving image format of the auxiliary moving image output from the moving image data extraction unit 32 into a moving image format suitable for input to the moving image encoder 6 and outputs the image data to the input image selector switch 16.

In step S313, the auxiliary moving image output from the auxiliary image selection unit 15 is input to the moving image encoder 6 through the terminals B and S of the input image selector switch 16.

On the other hand, if it is determined in step S305 that no registered keyword is contained in the recognized phrase data (NO), the keyword determination unit 14 outputs a control signal to control to connect the terminal A to the terminal S in the input image selector switch 16. The flow advances to step S315.

In step S315, the camera image output from the image sensing unit 4 is input to the moving image encoder 6.

In step S317, the moving image encoder 6 generates transmission moving image data by converting the camera image data output from the image sensing unit 4 or the auxiliary moving image data output from the auxiliary image selection unit 15 into a format suitable for transmission through the network and outputs the transmission moving image data to the multiplexing unit 17.

In step S319, the multiplexing unit 17 multiplexes the transmission voice data which has been output from the voice reception unit 3 and undergone data format conversion by the voice encoder 5 in step S301 and the transmission moving image data output from the moving image encoder 6 in step S317 and outputs the multiplexed data to the transmission unit 7.

In step S321, the transmission unit 7 transmits the multiplexed data output from the multiplexing unit 17 through the information communication network.

The multiplexed data transmitted from the transmission unit 7 is received by the reception unit 8 of the reception apparatus 2 and displayed on the display unit 12, as in the case wherein a still image is used as an auxiliary image.

The auxiliary image display period for a still image or moving image as an auxiliary image may be set to a predetermined time. Alternatively, a specific keyword to end the display may be registered in advance so that the sender can end the display by uttering the specific keyword. More specifically, when a specific keyword that represents the end of display is searched for by the keyword matching unit 21, a control signal (specific switching signal) to control to connect the terminal S to the terminal A in the input image selector switch 16 is output to it to connect the terminals S and A in it. The camera image output from the image sensing unit 4 is output to the moving image encoder 6 through the terminals A and S of the input image selector switch 16.

As described above, in communication using a communication apparatus which displays an image in real time, a communication apparatus and method with higher operability, which allow displaying an auxiliary image other than a main image without taking care to the operability, can be provided. In addition, an effect for reducing consumption of resources related to image display can be obtained. Furthermore, in the above communication apparatus and method, communication for displaying an image in real time by using a simple protocol can be implemented.

SECOND EMBODIMENT

Figure 7:
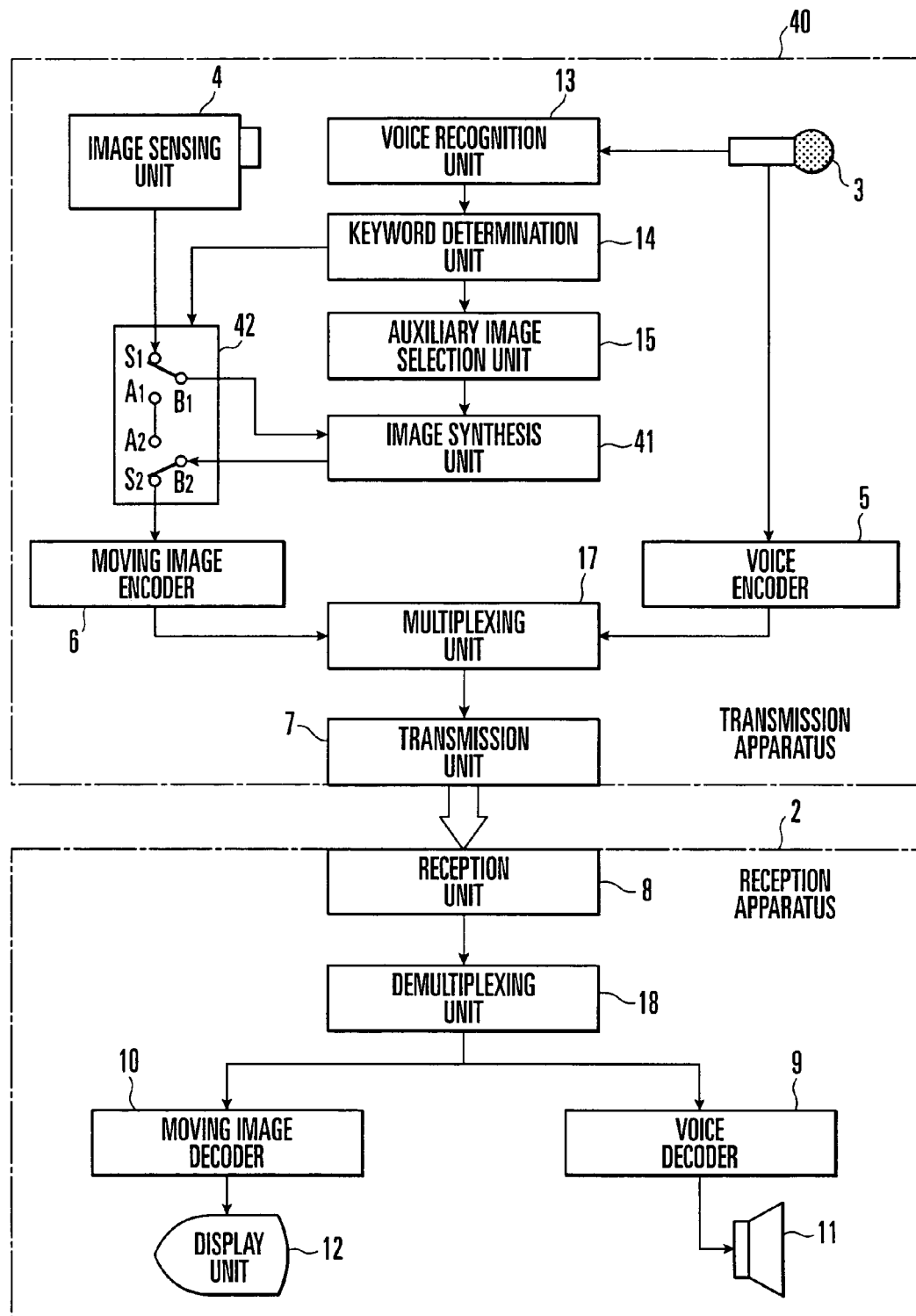
FIG. 7 is a block diagram showing the schematic arrangement of the second embodiment.

FIG. 7 shows the schematic arrangement of the second embodiment of the present invention. In this embodiment, a transmission apparatus 40 has an image synthesis unit 41 to generate moving image data by synthesizing a camera input image and auxiliary image. In a TV phone according to this embodiment, one TV phone apparatus comprises both the transmission apparatus 40 and a reception apparatus 2. In the following description, a description of the transmitting-side reception apparatus and that of the receiving-side transmission apparatus will be omitted to for easy understanding. The operation on the receiving side is almost the same as that described in the first embodiment.

Referring to FIG. 7, this embodiment includes the transmission apparatus 40, the reception apparatus 2, and an information communication network.

The information communication network is capable of bidirectional communication data transmission/reception using wire communication or wireless communication.

The transmission apparatus 40 converts voice input by a sender and an image to be displayed on the reception apparatus 2 into data formats transmittable through the information communication network and transmits the data to the reception apparatus 2.

The reception apparatus 2 receives the data transmitted from the transmission apparatus 40 through the information communication network and outputs/displays the voice and image.

The transmission apparatus 40 further comprises a voice reception unit 3, image sensing unit 4, voice encoder 5, moving image encoder 6, multiplexing unit 17, voice recognition unit 13, keyword determination unit 14, auxiliary image selection unit 15, input image selector switch 42, image synthesis unit 41, and transmission unit 7.

The image sensing unit 4 is a still image photographing apparatus such as a digital camera or a moving image photographing apparatus such as a video camera. The image sensing unit 4 is incorporated in or externally connected to the transmission apparatus 40. The image sensing unit 4 senses the video image of a sender in real time, converts the sensed image into an electrical signal, and outputs it to the input image selector switch 42 as image data.

The voice reception unit 3 is a sound collection apparatus which collects voice uttered by a sender. The voice reception unit 3 is incorporated in or externally connected to the transmission apparatus 40. The voice reception unit 3 collects voice uttered by a sender in real time, converts the collected voice into an electrical signal, and outputs the converted voice to the voice recognition unit 13 and voice encoder 5 as voice data.

The voice recognition unit 13 is an information processing function of receiving the voice data output from the voice reception unit 3 and automatically recognizing a phrase contained in the received voice data. The phrase recognized by this voice recognition processing is output as recognized phrase data.

The keyword determination unit 14 is an information processing function of determining whether the recognized phrase data output from the voice recognition unit 13 coincides with a keyword that is registered in advance. The keyword determination unit 14 outputs a control signal to the input image selector switch 42 to selectively connect terminals in it and outputs an instruction (auxiliary image selection instruction) to the auxiliary image selection unit 15 to select an auxiliary image. The auxiliary image selection instruction contains the keyword which is determined to coincide with the recognized phrase data. The control signal and auxiliary image selection instruction are output from the keyword determination unit 14 on the basis the determination result by it.

The auxiliary image selection unit 15 receives the auxiliary image selection instruction transmitted from the keyword determination unit 14. On the basis of the received auxiliary image selection instruction, the auxiliary image selection unit 15 selects auxiliary image data corresponding to the keyword and outputs it to the image synthesis unit 41.

The image synthesis unit 41 is an image synthesis function of generating a synthesized image by synthesizing the camera image and auxiliary image. The generated synthesized image is output to the input image selector switch 42.

The input image selector switch 42 selectively outputs, to the moving image encoder 6, at least one of the image data output from the image sensing unit 4 and the synthesized image data output from the image synthesis unit 41. Switching of the image data to be output to the moving image encoder 6 is done by the control signal output from the keyword determination unit 14.

The moving image encoder 6 is an image data conversion function of converting the data format to transmit the image data output from the image sensing unit 4 or the synthesized image data output from the image synthesis unit 41 to the reception apparatus 2. A format which can transmit moving image data in an optimum state to the reception apparatus 2 through the information communication network is used as the conversion format.

The voice encoder 5 is a voice data conversion function of converting the data format to transmit the voice data output from the voice reception unit 3 to the reception apparatus 2. A format which can transmit voice data in an optimum state to the reception apparatus 2 through the information communication network is used as the conversion format.

The multiplexing unit 17 is a data synthesis function of multiplexing the transmission moving image data which has undergone data format conversion by the moving image encoder 6 and the transmission voice data which has undergone data format conversion by the voice encoder 5. The multiplexed data is output to the transmission unit 7.

The transmission unit 7 is a data transmission function. The transmission unit 7 transmits the multiplexed data output from the multiplexing unit 17 to a reception unit 8 of the reception apparatus 2 through the information communication network.

Figure 8:
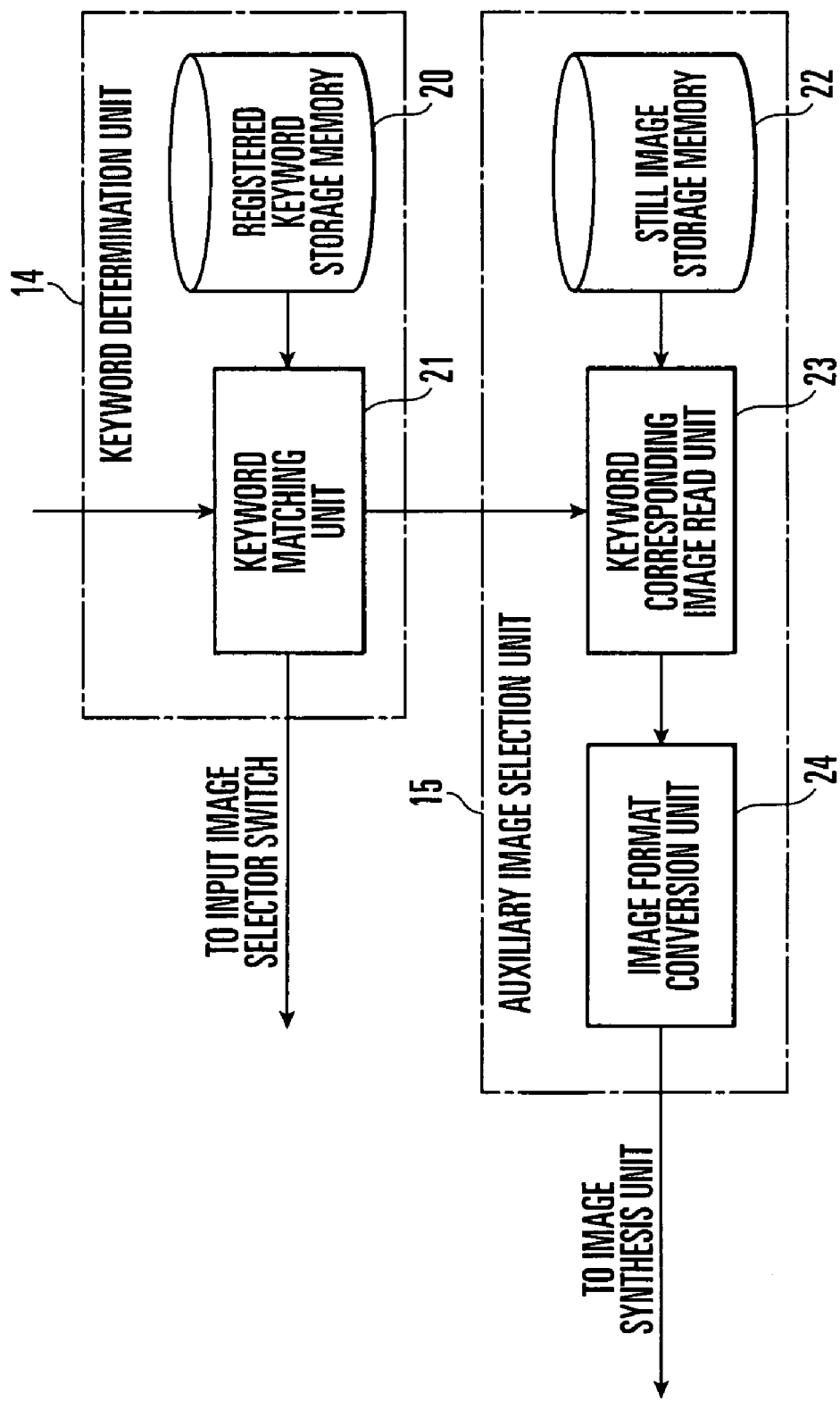
FIG. 8 is a block diagram showing details of the internal arrangement of a keyword determination unit and auxiliary image selection unit when a still image is used as an auxiliary image.

FIG. 8 shows details of the internal arrangement of the keyword determination unit 14 and auxiliary image selection unit 15 when a still image is used as an auxiliary image. The keyword determination unit 14 and auxiliary image selection unit 15 have the same arrangement as in FIG. 2 except that synthesized image data from an image format conversion unit 24 of the auxiliary image selection unit 15 is output to the image synthesis unit 41.

Figure 9:
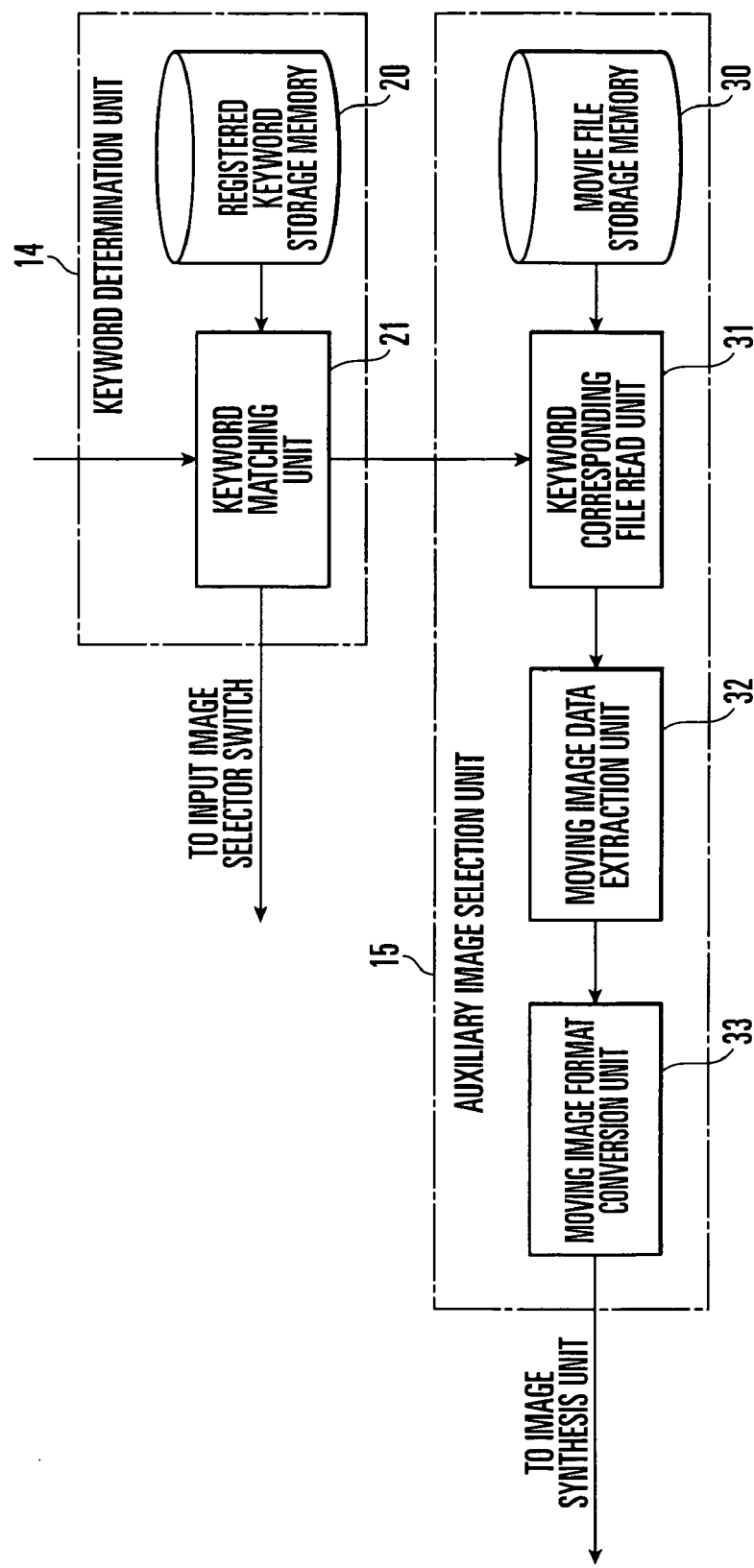
FIG. 9 is a block diagram showing details of the internal arrangement of the keyword determination unit and auxiliary image selection unit when a moving image is used as an auxiliary image.

FIG. 9 shows details of the internal arrangement of the keyword determination unit 14 and auxiliary image selection unit 15 when a moving image is used as an auxiliary image. The keyword determination unit 14 and auxiliary image selection unit 15 have the same arrangement as in FIG. 3 except that synthesized image data from a moving image format conversion unit 33 of the auxiliary image selection unit 15 is output to the image synthesis unit 41.

Figure 10:
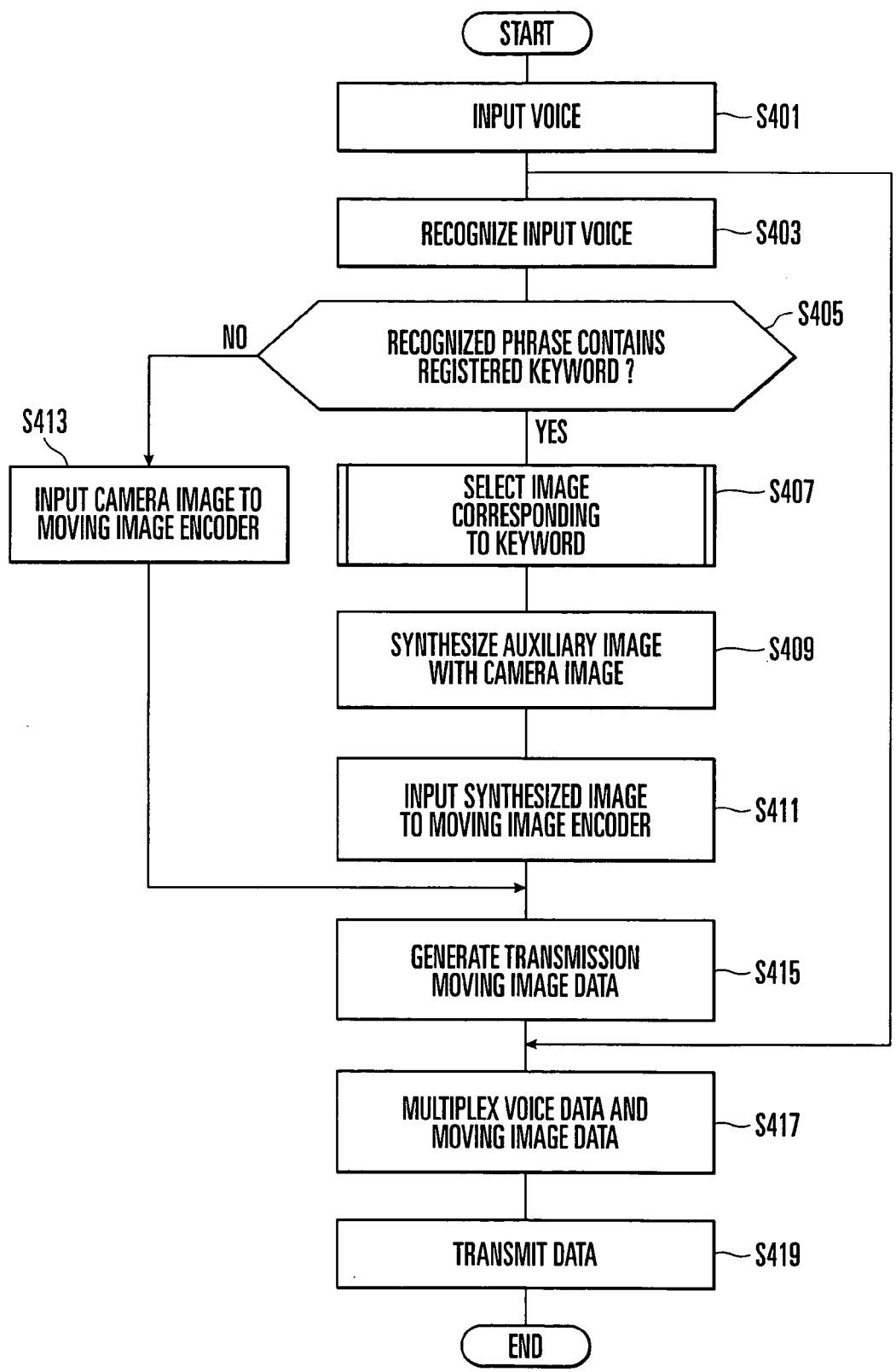
FIG. 10 is a flowchart showing the operation on the transmitting side.

The operation of this embodiment will be described next. FIG. 10 shows the operation of this embodiment.

Referring to FIG. 10, in step S401, the user of the TV phone to be described in this embodiment inputs voice for speech communication from the voice reception unit 3. The voice reception unit 3 converts the voice input in step S401 into an electrical signal and outputs it to the voice recognition unit 13 and voice encoder 5 as voice data.

In step S403, the voice data output from the voice reception unit 3 is input to the voice recognition unit 13. The voice recognition unit 13 executes voice recognition processing for automatically recognizing a phrase contained in the received voice data. The recognized phrase is output as recognized phrase data.

The recognized phrase data output from the voice recognition unit 13 is sent to the keyword determination unit 14. In step S405, the keyword determination unit 14 determines whether a registered keyword is contained in the recognized phrase data. If it is determined in step S405 that a registered keyword is contained in the recognized phrase data (YES), the keyword determination unit 14 outputs, to the input image selector switch 42, a control signal (switching signal) to control to connect a terminal $S_1$ to a terminal $B_1$ and a terminal $B_2$ to a terminal $S_2$ in the input image selector switch 42. The keyword determination unit 14 also outputs an auxiliary image selection instruction to read out an auxiliary image. The flow advances to step S407.

In step S407, the auxiliary image selection instruction output from the keyword determination unit 14 is input to the auxiliary image selection unit 15. When the auxiliary image is a still image, upon receiving the auxiliary image selection instruction, the auxiliary image selection unit 15 causes a keyword corresponding image read unit 23 and the image format conversion unit 24 to execute the instruction.

Figure 11:
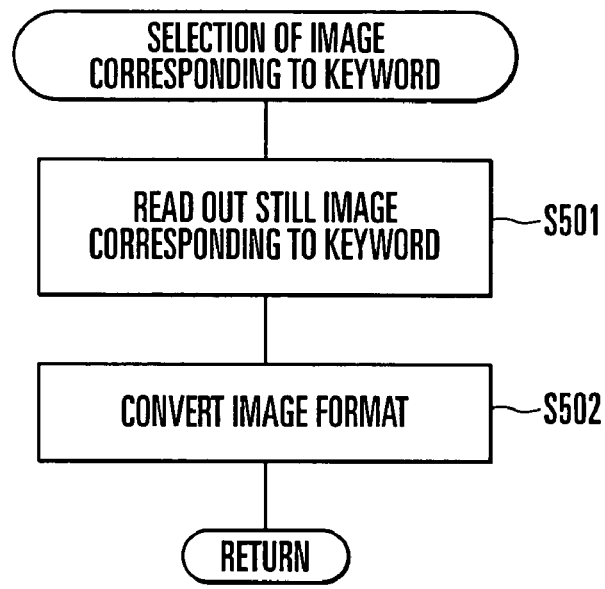
FIG. 11 is a flowchart showing the auxiliary image selection operation when a still image is used as an auxiliary image.

More specifically, in step S501 in FIG. 11, the keyword corresponding image read unit 23 reads out a still image corresponding to the keyword from the still image storage memory 22 and outputs the readout auxiliary image corresponding to the keyword to the image format conversion unit 24. In step S502 in FIG. 11, the image format conversion unit 24 converts the image format of the still image as an auxiliary image, which is output from the keyword corresponding image read unit 23, into an image format suitable for input to the moving image encoder 6 and outputs the image data to the image synthesis unit 41.

When the auxiliary image is a moving image, the auxiliary image selection unit 15 causes a keyword corresponding file read unit 31, moving image data extraction unit 32, and moving image format conversion unit 33 to execute the instruction.

Figure 12:
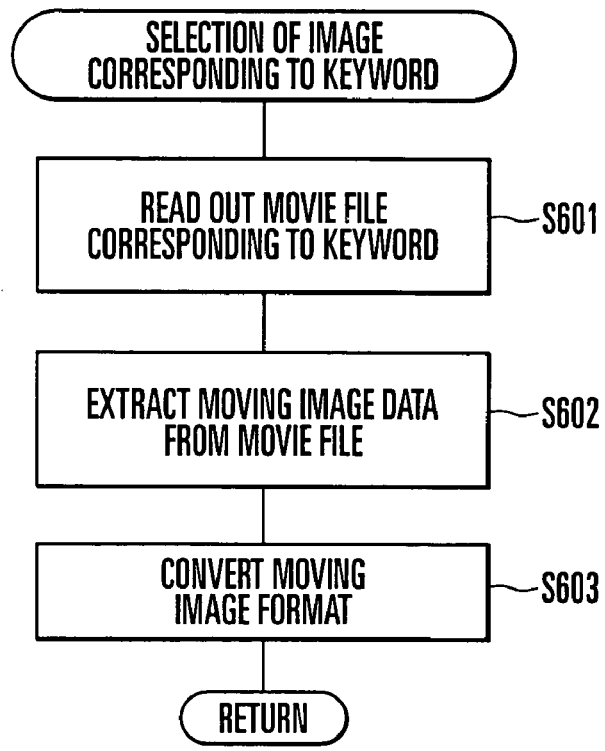
FIG. 12 is a flowchart showing the auxiliary image selection operation when a movie file is used as an auxiliary image.
Figure 13:
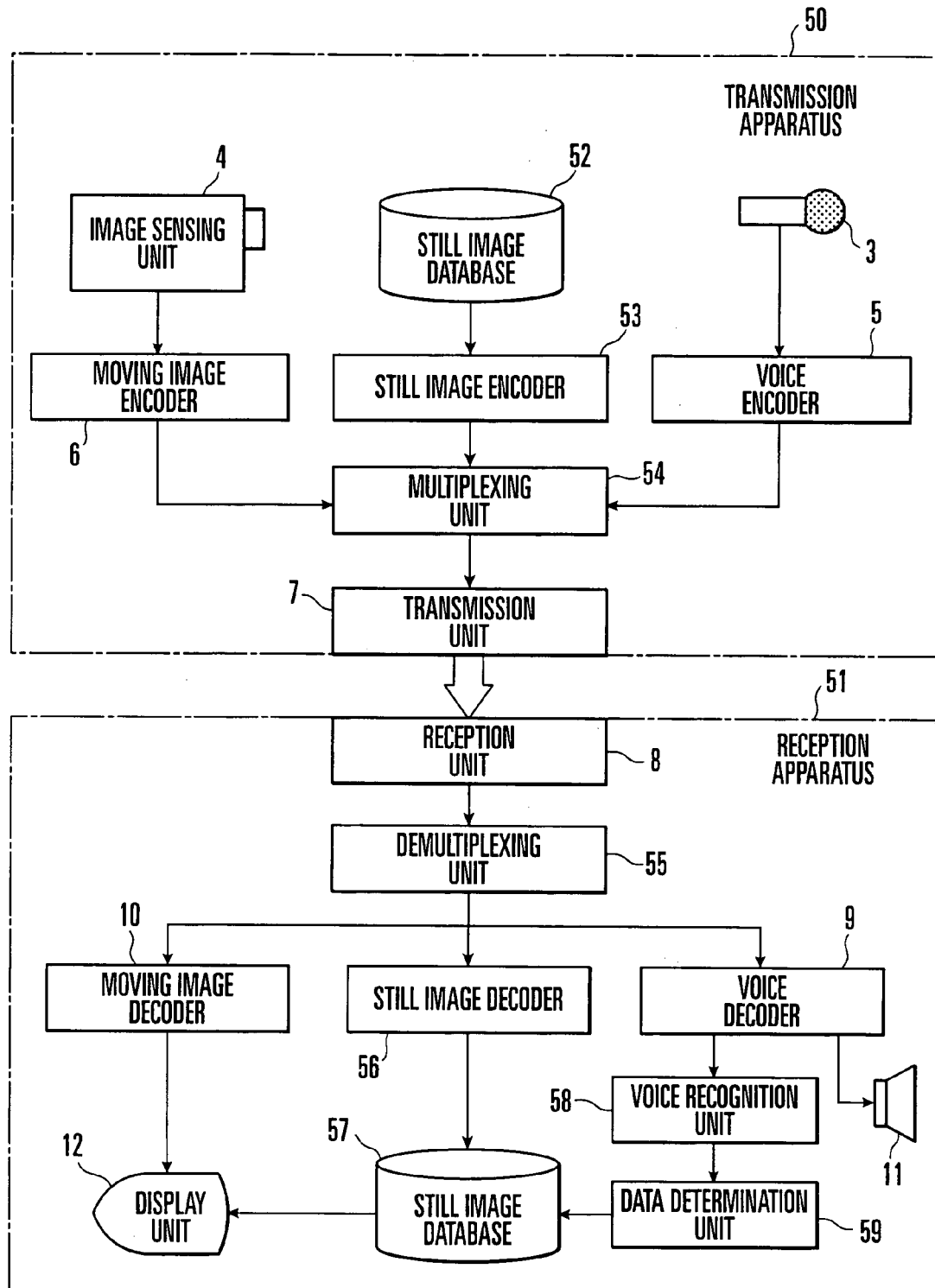
FIG. 13 is a block diagram showing the arrangement of a conventional video conference system.

More specifically, in step S601 in FIG. 12, the keyword corresponding file read unit 31 reads out a movie file from the movie file storage memory 30 and outputs the readout movie file corresponding to the keyword to the moving image data extraction unit 32. In step S602 in FIG. 12, the data extraction unit 32 extracts image data from the movie file corresponding to the keyword, which is output from the keyword corresponding file read unit 31, and outputs the extracted image data to the moving image format conversion unit 33. In step S603 in FIG. 12, the moving image format conversion unit 33 converts the moving image format of the auxiliary moving image output from the moving image data extraction unit 32 into a moving image format suitable for input to the moving image encoder 6 and outputs the image data to the image synthesis unit 41.

In step S409 in FIG. 10, the image synthesis unit 41 synthesizes the still image or moving image selected by the auxiliary image selection unit 15 with the camera image output from the image sensing unit to generate a synthesized image and outputs it to the input image selector switch 42.

In step S411, the synthesized image output from the image synthesis unit 41 through the terminals $B_2$ and $S_2$ of the input image selector switch 42 is input to the moving image encoder 6.

On the other hand, if it is determined in step S405 that no registered keyword is contained in the recognized phrase data (NO), the keyword determination unit 14 outputs a control signal to control to connect the terminal $S_1$ to a terminal $A_1$ and a terminal $A_2$ to the terminal $S_2$ in the input image selector switch 42. The flow advances to step S413.

In step S413, the camera image sensed by the image sensing unit 4 is input to the moving image encoder 6 through the terminals $S_1$, $A_1$, $A_2$, and $S_2$.

In step S415, the moving image encoder 6 generates transmission moving image data by converting the camera image output from the image sensing unit 4 or the synthesized image output from the image synthesis unit 41 into a format suitable for transmission through the network and outputs the transmission moving image data to the multiplexing unit 17.

In step S417, the multiplexing unit 17 multiplexes the transmission voice data which has been output from the voice reception unit 3 and undergone data format conversion by the voice encoder 5 in step S401 and the transmission moving image data output from the moving image encoder 6 in step S415 and outputs the multiplexed data to the transmission unit 7.

In step S419, the transmission unit 7 transmits the multiplexed data output from the multiplexing unit 17 through the information communication network.

The multiplexed data transmitted from the transmission unit 7 is received by the reception unit 8 of the reception apparatus 2 and displayed on the display unit 12, as in the first embodiment.

The auxiliary image display period for a still image or moving image as an auxiliary image may be set to a predetermined time. Alternatively, a specific keyword to end the display may be registered in advance so that the sender can end the display by uttering the specific keyword. More specifically, when a specific keyword that represents the end of display is searched for by the keyword matching unit 21, a control signal (specific switching signal) to control to connect the terminal $S_1$ to the terminal $A_1$ and the terminal $S_2$ to the terminal $A_2$ in the input image selector switch 42 is output to it to connect the terminal $S_1$ to the terminal $A_1$ and the terminal $S_2$ to the terminal $A_2$. The camera image output from the image sensing unit 4 is output to the moving image encoder 6 through the terminals $S_1$ and $A_1$ and the terminals $A_2$ and $S_2$ of the input image selector switch 42.

As described above, in communication using a communication apparatus which displays an image in real time, a communication apparatus and method with higher operability, which allow displaying an auxiliary image other than a main image without taking care to the operability, can be provided. In addition, an effect for reducing consumption of resources related to image display can be obtained. Furthermore, in the above communication apparatus and method, communication for displaying an image in real time by using a simple protocol can be implemented.

What is claimed is:

1. A communication apparatus comprising:
    image sensing means for sensing a camera image;
    voice recognition means for recognizing a phrase from input voice;
    keyword detection means for detecting coincidence between a registered keyword and the phrase output from said voice recognition means;
    auxiliary image selection means for selecting a specific auxiliary image associated with the registered keyword in response to a coincidence detection output from said keyword detection means;
    input image switching means for, in response to the coincidence detection output, selectively outputting one of the camera image output from said image sensing means and an image containing the auxiliary image output from said auxiliary image selection means; and
    transmission means for transmitting the input voice and the image output from said input image switching means,
    wherein
    said keyword detection means outputs a switching signal to said input image switching means in response to the coincidence detection output, and
    said input image switching means switches the image to be output from the camera image to the image containing the auxiliary image in response to the switching signal output from said keyword detection means.

2. An apparatus according to claim 1, wherein
    said keyword detection means outputs a specific switching signal to said input image switching means in response to detection of coincidence between a phrase and a specific keyword, and
    said input image switching means switches the image to be output from the image containing the auxiliary image to the camera image in response to the specific switching signal output from said keyword detection means.

3. A communication apparatus comprising:
    image sensing means for sensing a camera image;
    voice recognition means for recognizing a phrase from input voice;
    keyword detection means for detecting coincidence between a registered keyword and the phrase output from said voice recognition means;
    auxiliary image selection means for selecting a specific auxiliary image associated with the registered keyword in response to a coincidence detection output from said keyword detection means;
    input image switching means for, in response to the coincidence detection output, selectively outputting one of the camera image output from said image sensing means and an image containing the auxiliary image output from said auxiliary image selection means;
    transmission means for transmitting the input voice and the image output from said input image switching means; and
    image synthesis means for, in response to the coincidence detection output, synthesizing the camera image output from said image sensing means with the auxiliary image output from said auxiliary image selection means to generate a synthesized image and outputting the synthesized image to said input image switching means,
    wherein in response to the coincidence detection output, said input image switching means switches between the camera image output from said image sensing means and the synthesized image output from said image synthesis means and outputs the switched image to said transmission means,
    wherein
    said keyword detection means outputs a switching signal to said input image switching means in response to the coincidence detection output, and
    said input image switching means switches the image to be output from the camera image to the synthesized image in response to the switching signal output from said keyword detection means.

4. A communication apparatus comprising:
    image sensing means for sensing a camera image;
    voice recognition means for recognizing a phrase from input voice;
    keyword detection means for detecting coincidence between a registered keyword and the phrase output from said voice recognition means;
    auxiliary image selection means for selecting a specific auxiliary image associated with the registered keyword in response to a coincidence detection output from said keyword detection means;
    input image switching means for, in response to the coincidence detection output, selectively outputting one of the camera image output from said image sensing means and an image containing the auxiliary image output from said auxiliary image selection means;

transmission means for transmitting the input voice and the image output from said input image switching means; and image synthesis means for, in response to the coincidence detection output, synthesizing the camera image output from said image sensing means with the auxiliary image output from said auxiliary image selection means to generate a synthesized image and outputting the synthesized image to said input image switching means, wherein in response to the coincidence detection output, said input image switching means switches between the camera image output from said image sensing means and the synthesized image output from said image synthesis means and outputs the switched image to said transmission means, wherein said keyword detection means outputs a specific switching signal to said input image switching means in response to detection of coincidence between a phrase and a specific keyword, and said input image switching means switches the image to be output from the synthesized image to the camera image in response to the specific switching signal output from said keyword detection means.

5. A communication method comprising:
sensing a camera image;
recognizing a phrase from input voice;
detecting coincidence between the phrase and a registered keyword;
selecting a specific auxiliary image associated with the registered keyword in response to a coincidence detection output;
in response to the coincidence detection output, selectively outputting one of the sensed camera image and an image containing the selected auxiliary image; and
transmitting one of the output camera image and the auxiliary image,
wherein
the selective output step comprises the steps of:
outputting a switching signal in response to the coincidence detection output, and
switching the image to be output from the camera image to the image containing the auxiliary image in response to the switching signal.

6. A communication method comprising:
sensing a camera image;
recognizing a phrase from input voice;
detecting coincidence between the phrase and a registered keyword;
selecting a specific auxiliary image associated with the registered keyword in response to a coincidence detection output;
in response to the coincidence detection output, selectively outputting one of the sensed camera image and an image containing the selected auxiliary image; and
transmitting one of the output camera image and the auxiliary image,
wherein
the selective output step comprises the steps of:
outputting a specific switching signal in response to detection of coincidence between a phrase and a specific keyword, and
switching the image to be output from the image containing the auxiliary image to the camera image in response to the specific switching signal.

7. A communication method comprising:
sensing a camera image;
recognizing a phrase from input voice;
detecting coincidence between the phrase and a registered keyword;
selecting a specific auxiliary image associated with the registered keyword in response to a coincidence detection output;
in response to the coincidence detection output, selectively outputting one of the sensed camera image and an image containing the selected auxiliary image;
transmitting one of the output camera image and the auxiliary image; and
synthesizing the sensed camera image with the selected auxiliary image to generate a synthesized image,
wherein in the selective output means, one of the camera image and the synthesized image is selectively output
wherein
the selective output step comprises the steps of
outputting a switching signal in response to the coincidence detection output, and
switching the image to be output from the camera image to the synthesized image in response to the switching signal.

8. A communication method comprising:
sensing a camera image;
recognizing a phrase from input voice;
detecting coincidence between the phrase and a registered keyword;
selecting a specific auxiliary image associated with the registered keyword in response to a coincidence detection output;
in response to the coincidence detection output, selectively outputting one of the sensed camera image and an image containing the selected auxiliary image;
transmitting one of the output camera image and the auxiliary image; and
synthesizing the sensed camera image with the selected auxiliary image to generate a synthesized image,
wherein
the selective output step comprises the steps of
outputting a specific switching signal in response to detection of coincidence between a phrase and a specific keyword, and
switching the image to be output from the synthesized image to the camera image in response to the specific switching signal.

* * * * *